United States Patent Office 3,376,805
Patented Apr. 9, 1968

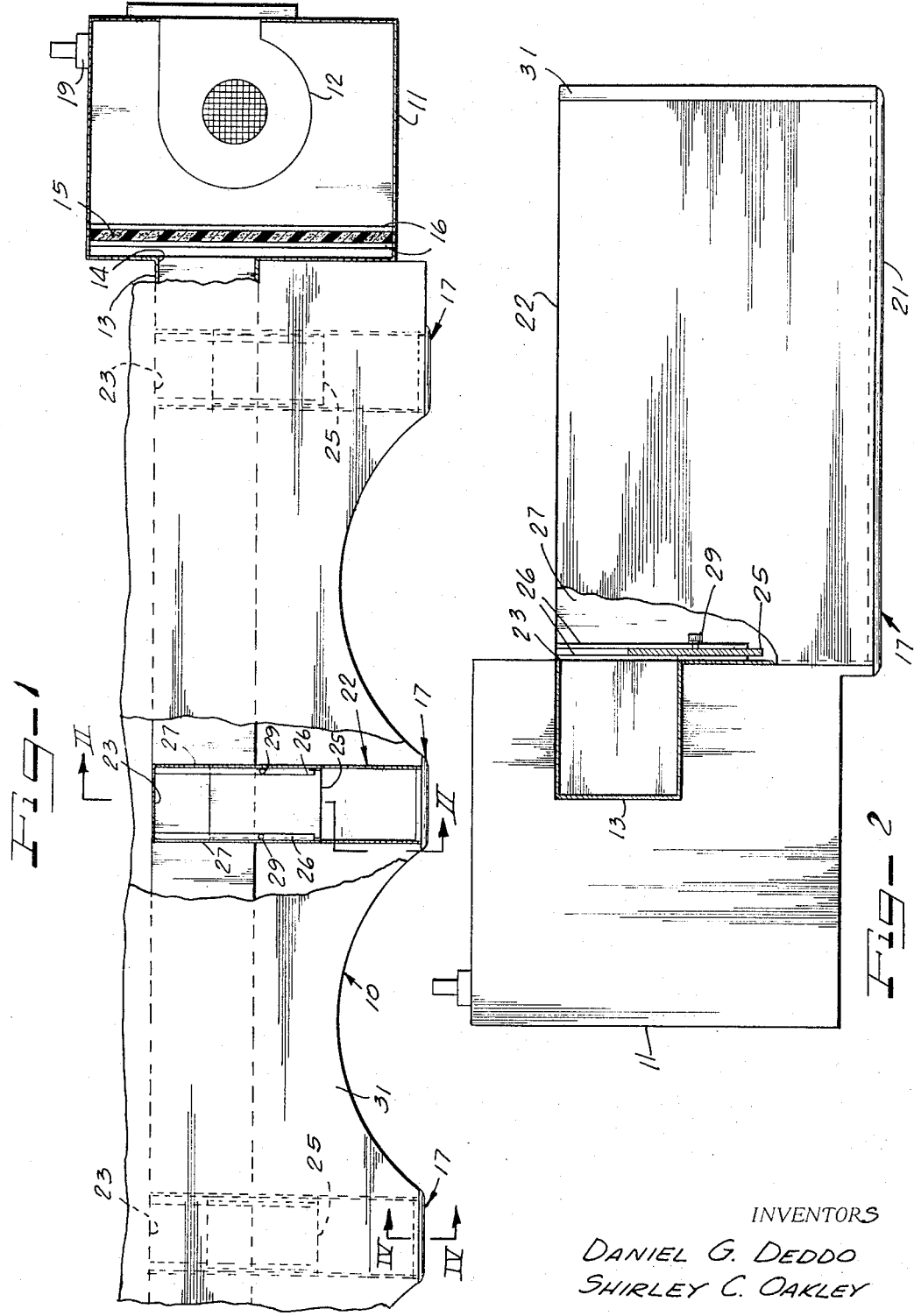

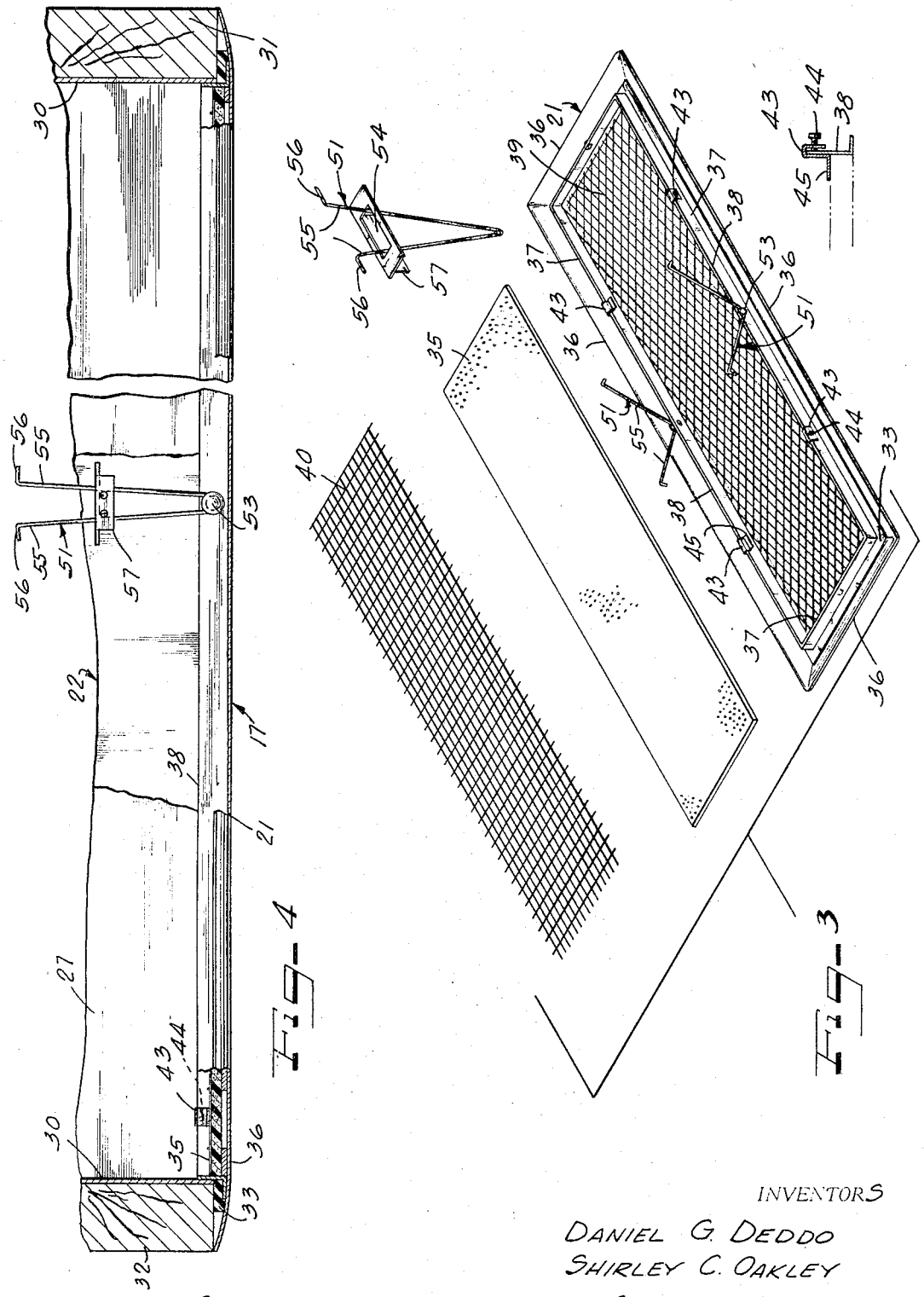

3,376,805
AIR CIRCULATION AND FILTER SYSTEM
Daniel G. Deddo, 5101 W. St. Paul, Chicago, Ill. 60639, and Shirley C. Oakley, 3700 W. Wrightwood Ave., Chicago, Ill. 60647
Filed May 9, 1966, Ser. No. 548,750
5 Claims. (Cl. 98—115)

ABSTRACT OF THE DISCLOSURE

Air recirculation and filtering system for filtering lacquer spray dust from the air in beauty salons. The apparatus comprises a suction duct extending along the ceiling of a beauty salon with a suction blower at the discharge end of the duct and arranged to recirculate the filtered air drawn through the duct, back to the beauty salon. An intake duct for each operator's station leads downwardly from the suction duct. Each intake duct is provided with a damper to enable the air flow through all of the intake ducts to be balanced. The filtering means includes a frame sealed to each intake duct and having a grille facing the room. A filtering element is supported in the frame and extends along the grille. A screen in the frame retains the filtering element from deformation by the pressure of air passing through the filtering element. A filter is also provided at the intake of the suction blower and an audible warning signal is spaced downstream of the filter for the blower unit, to give a warning signal upon the clogging of the filter.

Background of the Invention

This invention relates to improvements in filter systems and more particularly relates to such systems adapted to free the rooms of beauty salons from lacquer laden spray dust.

In beauty salons, the practice has developed of spraying the hair with setting sprays in order to retain the set over relatively long periods of time. These sprays all contain a lacquer which has a disagreeable odor and settles in the form of a scum and besides creating a dirty condition and being disagreeable to the patrons of the salon is deleterious to the health of the patrons, and particularly the operators, which are subject to this lacquer in the atmosphere for a greater part of the time the operator is in the salon.

Summary and objects of the Invention

This invention has as its principal objects to remedy the disagreeable and noxious conditions of the air in beauty salons caused by hair sprays, by providing a simple and novel form of filtering system for maintaining the air in the salon free from disagreeable and noxious spray dust.

Another object of the invention is to provide an improved form of filter assembly for trapping lacquer laden spray dust in the atmosphere and diluting the freon propellant with air.

A further object of the invention is to provide a filtering and ventilating system for a room and particularly a beauty salon, drawing the air in the salon upwardly towards the ceiling and filtering the air as drawn toward the ceiling to remove lacquer spray dust therefrom, and returning the filtered air back to the room.

Still another object of the invention is to provide an improved form of filtering system particularly adapted for filtering lacquer spray dust from the air in beauty salons, in which a plurality of filters is mounted adjacen the ceiling of a room, one or more being associated with each chair and operator, in which a blower unit draws lacquer laden air through the filters, and in which a duct and control system is provided from the filters to the blower operable to attain a balanced flow of air through the filters.

These and other objects of the invention will appear from time to time as the following specification proceeds and with reference to the accompanying drawings wherein:

FIGURE 1 is a generally diagrammatic side elevational view of a filtering system constructed in accordance with the principles of the present invention, with certain parts broken away and certain other parts shown in vertical section;

FIGURE 2 is an enlarged partial fragmentary sectional view taken substantially along line II—II of FIGURE 1;

FIGURE 3 is an exploded view of one of the filtering units; and

FIGURE 4 is an enlarged partial fragmentary sectional view taken substantially along line IV—IV of FIGURE 1 and showing a filtering unit in position in a downwardly opening air duct.

In the embodiment of the invention illustrated in the drawings, we have shown in FIGURE 1 a filtering system which may be in the form of a canopy 10 extending along one wall and beneath the ceiling of a room The canopy 10 is shown as including a blower housing 11 at one end and having a suction blower 12 mounted therein. The blower 12 is a conventional form of motor driven blower and draws filtered air from the room along the blower housing adjacent the inlet 14, upstream of the room along a wall thereof. The duct 13 enters the blower housing 11 through an inlet 14. A filter 15, which may be made from a fiberglass filtering material, or any other suitable filtering material, extends across the blower housing adjacent the inlet 14, upstream of the blower 12. The filter 15 is retained to the blower housing 11 as by parallel spaced retainer guide strips 16, 16. Access may be had to the filter 15 through the blower housing 11 in a suitable manner, and no part of the present invention so not herein shown or described further. The filter 15 serves to protect the blower and its motor from lacquers or other materials which may pass through filtering units 17, opening downwardly into the room. A conventional form of signaling device 19 is shown as mounted in the top of the blower housing 11 to sound a signal in case the filter 15 should become clogged.

The filtering units 17 open downwardly into the room from a position adjacent the ceiling of the room and may be disposed to each side of each operator's chair, a substantial distance above the chairs and operators standing on the floor, to effectively draw in lacquer laden spray dust in suspension in the air, before the dust settles or is drawn into the lungs of the patrons or operators.

Each filtering unit 17 includes a frame 21 detachably mounted on the bottom of a duct 22 extending at right angles with respect to the duct 13 and having communication therewith through an inlet 23. A damper 25 is provided to regulate the flow of air from the duct 22 through the inlet 23. This damper is in the form of a plate slidably guided between parallel guides 26 extending vertically along opposite side walls 27 of the duct 22. Thumb screws 29 threaded in the outermost guides 26 are provided to hold the damper 25 in position. Access to the damper 25 and thumb screws 29 may be had through the bottom of the duct 22 upon removal of the filtering unit 17 therefrom. The dampers 25, adjustably mounted in each air duct 22 may be regulated by an anemometer, or like measuring instrument, to provide exactly the same flow of air through each filtering unit 17.

Each filtering unit 17 is supported inwardly of the outer margins of the frame 21, which is shown as extending along the bottom edge surfaces of the duct 22. The duct 22 may be made from sheet metal and includes end walls 30 connecting the side walls 22 together. A facia board 31 forms the front of the canopy and covers the ducts 22, as well as the blower housing 11, to provide a clean appearance. A board or rail 32 extends along the opposite wall 30 and cooperates with the facia board 31 and similar boards or rails (not shown) extending along the outsides of the walls 22 to form flat downwardly facing surfaces to be engaged by a seal 33 extending about the frame 21. The seal 33 thus prevents the short-circuiting of air along the edges of the frame 21 past a filter 35, carried by said frame.

The frame 21 is shown as being formed from marginal rails 36 joined together at the ends of said frame and curved toward the outer sides of the rails, to converge toward the ceiling and provide an exterior rectangular frame of pleasing appearance. Inwardly of the sides of the rails 36 in a rectangular retainer frame for the filter 35 formed from angles 37 suitably secured to the upper sides of the rails 36 on the horizontal legs of said angles and having vertical legs 38 extending upwardly of said rails and spaced inwardly of the inner sides thereof. The vertical legs 38 with the inner extending portions of the rails 36 of the frame define a rectangular flanged receptacle for a grille 39 and filter 35 supported on said grille. The grille 39 may be of any conventional wide open mesh form. The filter 35 is preferably a washable type of filter and may be made from one of the well known forms of foam materials commonly used as filters. The filter, however, need not necessarily be made from a foam material but may be made from fiberglass or any other suitable filtering material. The filter 35 is held from distortion by the flow of air therethrough by a wide mesh screen 40, which may be made from hardware cloth or any other suitable wide mesh screening material. The screen 40 may be sewed to the filter 35 if desired.

Hold-down clips 43, detachably secured to the vertical legs 38 of the angles 37, as by thumb screws 44, extend over the tops of said vertical legs from the outside thereof and downwardly along the insides of said legs and have inwardly extending feet 45 engageable with the top surface of the screen 40, to hold the screen 40 and filter 35 in place on the grille 39.

The frames 21 are shown in FIGURE 4 as held in position against the bottom surfaces of the ducts 22 by spring holders 51 of a conventional form. Said spring holders are each made from spring wire coiled intermediate the ends of the wire about a central pin or rivet 53 for one or more turns and having two diverging upwardly extending legs 55 forming continuations of the coiled portion of said spring holder that is turned about the rivet 53. The legs 55 have outturned ends 56, retaining said spring holder to a bracket 57, as the legs 55 are pressed toward each other to release the frame 21. The central pins or rivets 53 are secured to the vertical legs 38 of the side angle irons 37, intermediate the ends thereof. The brackets 57 are riveted or otherwise secured to the walls 27 of the ducts 22, at the transverse centers of said walls and are generally shown as being in the form of angle brackets. Each bracket 57 has a slot 59 in the horizontal leg thereof, through which the legs 55 fit, and against the ends of which the legs are pressed by the stored up energy of the coiled portion of the spring, to retain the frame to an inlet duct 22.

When it is desired to mount the frame 20 and its filter 35 and screen 46 to extend across the inlet end of a duct 22, it is merely necessary to press the legs 55 together and pass the outturned ends of said legs through the slots 56 of the brackets 57. Then, as the frame is moved upwardly toward the duct by hand, the legs will spread apart and tend to draw the frame 21 and seal 33 upwardly to engage the bottom end of the duct 22 and firmly hold the frame 21 and seal 33 to the intake end of said duct by the stored-up energy of the springs 51.

It should here be understood that a requisite of the filtering material used in the ducts 22 is that the material be of such a material that it may be cleaned or replaced at the end of the day, or before the start of the next day, to assure there will be no lacquer in the filter when starting the unit at the beginning of the day.

It should also be understood that while the filter 15 is shown as being a fiberglass filter, this filter may also be a foam filter although a fiberglass filter is used because the filter 15 is intended to stay in place over long periods of time and need not be cleaned every day, as in the case of the filters 35.

It should further be understood that the freon propellant is sufficiently diluted and dissipated in a controlled air chamber as to enable the air to be safely returned to the room, free from toxic gases.

While we have herein shown and described one form in which the invention may be embodied, it may readily be understood that various variations and modifications in the invention may be attained without departing from the spirit and scope of the novel concepts thereof.

We claim as our invention:

1. In an air circulating and filtering system particularly adapted for filtering lacquer spray dust from the air in beauty salons and in combination with a room having a floor and a ceiling, comprising:
   a canopy adapted to be mounted to extend along the ceiling of the room,
   a suction duct encompassed by said canopy,
   a plurality of downwardly opening ducts spaced along said suction duct and having communication therewith,
   a frame sealed to each downwardly opening suction duct and having a grille extending thereacross,
   a cleanable filtering element carried by said frame and extending along said grille,
   an adjustable damper in each downwardly opening suction duct downstream of each filtering element and operable to balance the flow of air through the filtering elements,
   a suction blower in communication with the discharge end of said common suction duct for drawing lacquer laden air through said filtering elements and having a discharge recirculating filtered air into the room, and
   a filtering element at the intake of said suction blower, filtering air drawn into said suction blower and thereby assuring the return of clean air to the room.

2. The structure of claim 1,
   wherein an air vacuum signal is spaced downstream of the filter for the suction blower and gives an audible warning signal upon the clogging of the filtering element at the intake of said suction blower.

3. The structure of claim 1,
   wherein a screen extends along the outgoing side of each filtering element in association with each downwardly opening duct, to retain the filtering element from deformation by the pressure of air passing therethrough.

4. A filter structure for beauty parlors including a room having a floor and a ceiling and having a plurality of operators' stations spaced along the room for mounting in the room comprising:
   a suction blower,
   a main suction duct extending along the room adjacent the ceiling and having communication with said blower,
   a plurality of downwardly opening ducts spaced along said main suction duct and having communication therewith,
   valve means controlling the flow of air from said downwardly opening ducts to said main suction duct, said downwardly opening ducts corresponding to the operator's stations in the beauty salon and spaced above said operator's station in lacquer dust drawing association therewith, a detachable filtering unit sealed to the downwardly opening end of each of said downwardly opening ducts and comprising:

a frame having an open grille and a filtering element supported thereon and sealed to said frame, a screen extending over said filtering element and holding said filtering element down, means holding said screen to said filtering element, and means detachably mounting said frame to a downwardly opening duct, affording a means for removing said frame and filtering element for the cleaning of said filtering element and adjusting said valve means.

5. The structure of claim 4, wherein a filtering element is at the intake of said suction blower, and wherein said suction blower returns filtered air to the room.

References Cited
UNITED STATES PATENTS

| | | | |
|---|---|---|---|
| 2,014,962 | 9/1935 | Bramsen | 98—115 |
| 2,862,437 | 12/1958 | Smith et al. | 98—115 |
| 2,939,378 | 6/1960 | Zalkind | 98—115 |

FOREIGN PATENTS

| | | |
|---|---|---|
| 18,749 | 1909 | Great Britain. |
| 770,219 | 3/1957 | Great Britain. |

ROBERT A. O'LEARY, *Primary Examiner.*

M. A. ANTONAKAS, *Assistant Examiner.*